May 26, 1964          W. JESCHKE          3,134,322

REGISTER-RETAINING APPARATUS FOR ROTARY SHEET PRESSES

Filed April 18, 1963          2 Sheets-Sheet 1

Inventor

Willi Jeschke

United States Patent Office 3,134,322
Patented May 26, 1964

3,134,322
REGISTER-RETAINING APPARATUS FOR
ROTARY SHEET PRESSES
Willi Jeschke, Heidelberg, Germany, assignor to Schnellpressenfabrik Aktiengesellschaft Heidelberg, Heidelberg, Germany, a corporation of Germany
Filed Apr. 18, 1963, Ser. No. 273,946
Claims priority, application Germany Apr. 21, 1962
6 Claims. (Cl. 101—183)

This invention relates generally to rotary letterpress color printing presses and more particularly to chain delivery systems for registered-transfer of individual sheets between a sheet-transfer system and individual gripper systems of the chain delivery mechanism.

Chain delivery apparatus for transferring registered sheets from one sheet-transfer mechanism to another are known. For example, such devices are used in series printing presses for transferring individual sheets from one printing unit to another by means of travelling gripper bars which are driven or transported by a pair of travelling chains. In these known chain delivery systems the gripper bars or systems are connected to the conveying or driving chains but are aligned with other sheet-transfer systems or grippers by means of guide members, for example, on the chain pulleys or on an impression cylinder which is adapted to cooperate with the chain pulley. Moreover, the gripper systems in chain delivery apparatus travel over a long path between printing units and in order to maintain the gripper systems aligned in guides all along the path thereof so that they are able to transfer the registered sheets without loss of registry would be an expensive proposition.

Apparatus are known in which the chain delivery has the individual gripper systems connected to the chains. The manufacture of such systems is expensive since the individual gripper bars must be connected to two chains. In these systems the teeth of the individual drive sprockets driving the chain have the space between the individual teeth cut so that the gripper carriage or mount on the chains of the individual gripper systems is allowed some movement or play. The chain delivery chains are adjusted so that only the right amount of slack is used in order to reduce wear and also to insure the best registered-transfer of sheets possible. In these devices holding systems on the chain pulleys are used for aligning or holding the gripper bars in a fixed and steady position during the transfer of the individual sheets to the individual gripper systems of the chain delivery or from the individual gripper systems to another sheet-transfer system.

In view of the required slack or play in the various known constructions the effect of centrifugal force on the gripper system as the chains are driven over the sprockets and change direction is such that the gripper systems are slightly lifted away from the chain drum or sprocket and difficulty is encountered in executing the sheet transfer without loss of registry of the sheet between a sheet-transfer system and the individual gripper bars of the chain delivery.

In order to prevent the gripper bars from being lifted in this manner by centrifugal force different clamping devices or guide rails have been used to control the gripper bar movement during the transfer interval. In each case, however, the controlling forces applied by these devices were not directed in the direction of the centrifugal force to which the gripper bars are subjected so that the known mechanisms still permitted some loss of registry at high speeds of the delivery system and when the speeds were being varied or changed. Moreover, in view of the fact that the control forces were not applied so as to cooperate with the centrifugal force the guide members were quickly worn and rollers on the gripper bars were subjected to a considerable amount of wear so that the wear on the rollers themselves and the guide surfaces resulted in difficulties in executing a registered-transfer of sheets.

According to the present invention apparatus is provided for use in conjunction with rotary letterpress color printing presses for registered-retaining transfer of sheets from one sheet transfer mechanism to the gripper bar, or vice versa, of revolving or driven chains of a chain delivery. A feature of the invention is the provision of a pair of spaced rollers adjacent each end of the gripper bars. A third roller cooperates with each pair of rollers and is automatically positioned in cooperative relationship with a respective pair of rollers and is resiliently biased in a direction for cooperating with the centrifugal force to which the individual gripper bars are subjected. When each third roller is engaged with the two spaced rollers of each pair of rollers the biased third or control roller biases the two rollers into rolling engagement with a respective fixed guide or reference surface disposed at opposite ends of the gripper bars, during the critical interval of transfer of sheets between the gripper bars and another gripper or sheet-transfer system so that the grippers are firmly held and registry is not lost during the transfer interval.

The individual control or centering third rollers and the guide or reference fixed surface with which each cooperates are disposed in a mutual vertical plane. The arrangement of the centering rollers at opposite ends of the gripper system and the respective tracks or guide surfaces cooperative therewith prevent the occurrence of tipping moments which unavoidably would cause loss of register during transfer of the individual sheets.

Other features and advantages of the apparatus in accordance with the present invention will be better understood as described in the following specification and appended claims, in conjunction with the following drawings in which:

Although the invention will be described as applicable to a rotary letterpress color printing press those skilled in the art will understand that the invention is equally applicable to chain delivery systems in other apparatus where sheets are transferred between the chain delivery system and other sheet-transfer systems.

Figure 1:
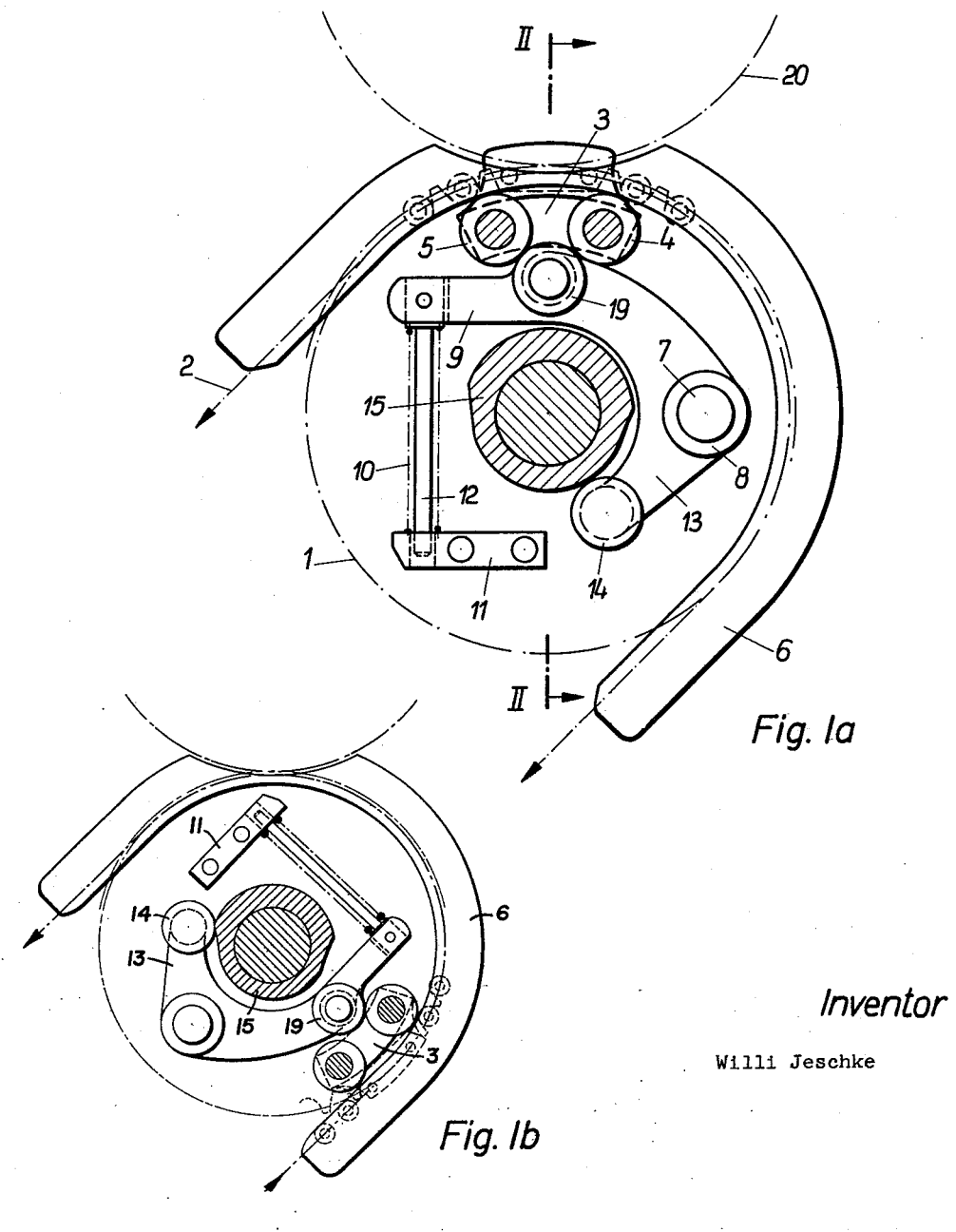
FIG. 1a is a fragmentary side elevation view of a press to which apparatus according to the invention has been applied.
FIG. 1b is a side elevation view of the apparatus of FIG. 1a illustrated on a reduced scale and a different operating position.
Figure 3:
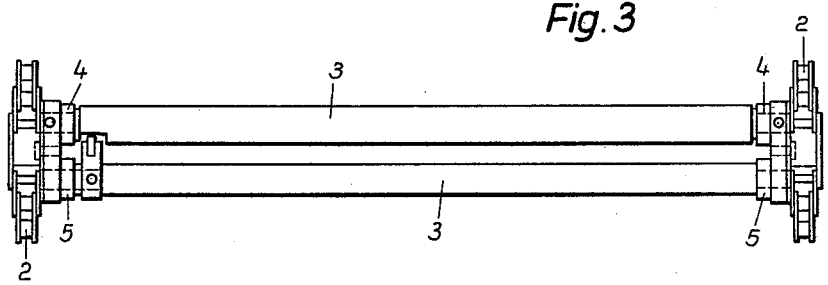
FIG. 3 is a fragmentary plan view of a chain delivery comprising the invention.

According to the drawing the apparatus according to the invention illustrated as applied only at one end of a chain delivery hereinafter described, however, it will be understood that an apparatus similar to that later described and shown in the drawings are mounted at an opposite end of the chain delivery. In the drawing the driven sprocket 1 drives a chain 2 of chain delivery means in a counterclockwise direction. Another sprocket, not shown, is disposed coaxially with the sprocket 1 for driving the other chain 2. The chain delivery comprises a plurality of gripper bars or systems, only one of which is illustrated in FIGS. 1 and 3 attached to the chains. The gripper bars 3 extend between two chains of the delivery system as illustrated in FIG. 3. The gripper bars 3 are provided with two pairs of rollers 4, 5 adjacent opposite ends thereof. Each pair of rollers comprises two spaced rollers 4, 5 rotatably mounted and transported along by the travelling chains. The two rollers 4, 5 of each pair have their rational axes parallel and spaced as illustrated in FIG. 1.

In order to maintain the gripper bars of the chain delivery in registry with other sheet-transfer means register-retaining means cooperative with the individual gripper bars of the chain delivery are provided according to the invention. A fixed arcuate guide 6 is provided at each sprocket defining a fixed guide or reference surface disposed radially outwardly of the chains 2 and the gripper bar rollers 4, 5 and disposed for engagement by the rollers 4, 5 during the time that the chain begins to change direction so that the gripper bars thereon begin to be subjected to centrifugal force.

In order to simplify the description only one apparatus according to the invention will be described but it will be understood a similar apparatus is mounted on the sprocket, not shown, coaxial with the sprocket 1. In order to positively control the gripper bars during the critical interval of sheet transfer, a bell-crank lever 8 mounted on a pivot 7 on the sprocket is provided. The bell-crank lever 8 has an arm 9 biased in a clockwise direction by a spring 10 illustrated diagrammatically and disposed circumferentially of an elongated bolt or pin 12 pivotally mounted on the arm 9 and axially guided in an abutment 11 on which the spring 10 abuts. The bell-crank lever movement is controlled by a cam follower 14 biased by the spring 10 into engagement with a fixed cam 15 concentric with the shaft 16 of the sprocket 1. The cam 15 is supported in fixed position by a lever arm 17 which is rigidly mounted in a sidewall 18 of the press.

The arm 9 of the bell-crank lever 8 has a centering or control roller 19 rotatably mounted therein and disposed in the path of travel of the pair of rollers 4, 5 so that when the rollers 4, 5 engage the guide 6 as shown in FIG. 1b the periphery of the roller 19 on the arm 9 is engaged without impact and the control roller positioned between the two spaced rollers 4, 5 so the spring 10 which biases the arm 9 in a clockwise direction causes cooperation with the cam profile so that the profile causes the roller 19 to be urged between the rollers 4, 5 of the gripper bars 3 and hence urge the rollers 4, 5 against the arcuate guide or reference surface of the guide 6 in the direction of the action of the centrifugal force to which the whole system is being subjected as the chains travel over the sprocket and change direction. The cam 15 has an eccentric profile for causing the cam follower 14 to cam the arm 9 in a direction for biasing the control roller 19 during the entire interval of engagement of the gripper bar rollers 4, 5 with the guide 6. Therefore, the gripper bars 3 are held in constant, positive engagement against the guide or reference surface of guide 6 so that during the critical transfer period the grippers of the gripper system are in satisfactory transfer registry with the grippers, not shown, of a sheet-transfer device, for example, a transfer cylinder 20 of the press and the individual gripper systems or bars are unaffected by the centrifugal forces to which they are subjected.

Figure 2:
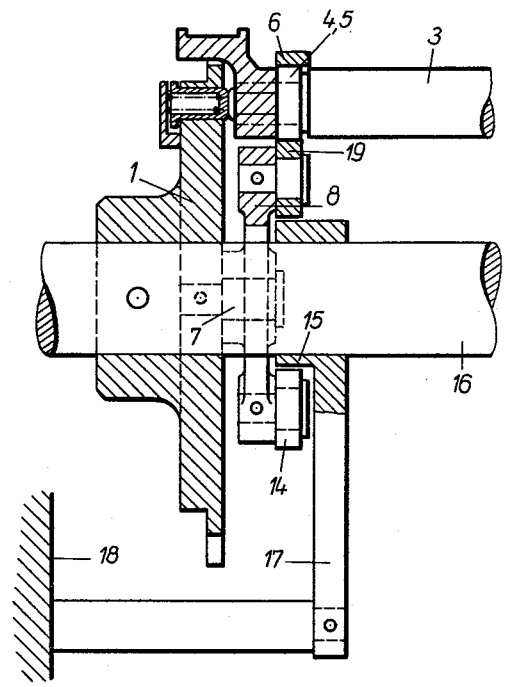
FIG. 2 is a sectional view taken along line 2—2.

As shown in FIG. 2, the gripper bars 3 and the rollers 4 and 5 are substantially in the same plane while the rollers 4, 5 are disposed in substantially the same vertical plane as the guide surface of the guide 6 so that by use of a comparable system on the opposite side of the carriage, all tipping moments are eliminated and a perfect registered transfer of registered sheets is executed. The guide 6 is sufficiently long to stabilize the gripper bars throughout an interval including the exact transfer interval.

While a preferred embodiment of the invention has been shown and described, it will be understood that many modifications and changes can be made within the true spirit and scope of the invention.

What I claim and desire to secure by Letters Patent is:

1. In a machine having chain driven gripper systems comprising a plurality of automatically operated systems and driven chains for transporting said gripper systems and having at least one other sheet-transfer system for transfer of registered sheets of material between it and said chain driven gripper systems individually, said gripper systems comprising bars extending transversely of said chains and means mounting said bars on said chains, the improvement which comprises register-retaining means cooperative with said chain-driven gripper systems individually comprising, two pairs of spaced rollers on said gripper bars adjacent opposite ends thereof, each pair of rollers having the axes of the two rollers extending substantially parallel and spaced from each other, means defining two fixed guide surfaces disposed for engagement by a respective one of said two pairs of rollers at least during transfer of a sheet between said sheet-transfer system and the individual gripper systems, means to bias said pairs of rollers into controlled rolling engagement with said guide surfaces during an interval of travelling movement of said chains corresponding at least to said interval during which said transfer takes place between said individual chain driven gripper systems, the last mentioned means comprising for each pair of said pairs of rollers a third roller automatically positioned between the rollers of a given pair of said two pairs of rollers for biasing said two rollers of said given pair into steady engagement with a respective one of said surfaces during said transfer interval, means mounting each of said third rollers for movement toward and away from said guide surfaces comprising means constantly resiliently biasing each of said third rollers toward said one guide surface thereby to permit said third rollers to be reciprocably movable in a direction away from said guide surfaces and to be urged between the two spaced rollers and bias them both into constant engagement with guide surfaces during said transfer interval, and means cooperative with said resilient means for automatically positioning said third rollers between the two spaced rollers of a respective pair of rollers and for urging them against a respective one of said surfaces, and said third rollers cooperating with said fixed guide surfaces when engaged between respective pair of rollers in positively holding said gripper systems steady during a transfer operation.

2. In a printing press having chain driven systems comprising a plurality of automatically operated gripper systems and driven chains for transporting said gripper systems and having at least one other sheet-transfer system for transfer of registered sheets of material between it and said chain driven gripper systems individually, said gripper systems comprising gripper bars extending transversely of said chains and means mounting said bars on said chains, the improvement which comprises register-retaining means cooperative with said chain-driven gripper systems individually comprising, two pairs of spaced rollers on said gripper bars adjacent opposite ends thereof, each pair of rollers having the axes of the two rollers extending substantially parallel and spaced from each other, means defining at least two oppositely disposed fixed guide surfaces disposed for engagement by a respective one of said two pairs of rollers at least during transfer of a sheet between said sheet-transfer system and the individual gripper systems, means to bias said pairs of rollers into controlled rolling engagement with said guide surfaces during an interval of travelling movement of said chains corresponding at least to said interval during which said transfer takes place between said individual chain driven gripper systems, the last mentioned means comprising for each pair of said pairs of rollers a third roller automatically positionable between the rollers of a given pair of said two pairs of rollers for biasing said two rollers of said given pair into steady engagement with a respective one of said surfaces during said transfer interval, means mounting each of said third rollers for movement toward and away from said guide surfaces comprising means constantly resiliently biasing each of said third rollers toward said one guide surface thereby to permit said third rollers to be reciprocably movable in a direction away from said guide surfaces and to be urged between the two spaced rollers and bias them both into constant engagement with said guide surfaces during said transfer interval, and means cooperative with said resilient means for automatically positioning said third rollers between the two spaced rollers of a respective pair of rollers for urging them against a respective one of said surfaces, and said third rollers cooperating with said fixed guide surfaces in positively holding said gripper systems steady during a transfer operation.

3. In a rotary printing press chain driven gripper systems comprising a plurality of automatically operated gripper systems and endless driven chains for transporting said gripper systems and having at least one other sheet-transfer system for transfer of registered sheets of material between it and said chain driven gripper systems individually, said gripper systems comprising gripper bars extending transversely of said chains and means mounting said bars on said chains, the improvement which comprises register-retaining means cooperative with said chain-driven gripper systems individually comprising, two pairs of spaced rollers on said gripper bars adjacent opposite ends thereof, each pair of rollers having the axes of the two rollers extending substantially parallel and spaced from each other, means defining at least two fixed, arcuate guide surfaces disposed for engagement by a respective one of said two pairs of rollers at least during transfer of a sheet between said sheet-transfer system and the individual gripper systems, means to bias said pairs of rollers into controlled rolling engagement with said guide surfaces during an interval of travelling movement of said chains corresponding at least to said interval during which said transfer takes place between said individual chain driven gripper systems, the last mentioned means comprising for each pair of said pairs of rollers a third roller automatically positionable between the rollers of a given pair of said two pairs of rollers for biasing said two rollers of said given pair into steady engagement with a respective one of said surfaces during said transfer interval, means mounting each of said third rollers for movement toward and away from said guide surfaces comprising means constantly resiliently biasing each of said third rollers toward said one guide surface thereby to permit said third rollers to be moved in a direction away from said guide surfaces and to be urged between the two spaced rollers and bias them both into constant engagement with said guide surfaces during said transfer interval, and means cooperative with said resilient means for automatically positioning said third rollers between the two spaced rollers of a respective pair of rollers for urging them against a respective one of said surfaces, and said third rollers cooperating with said fixed guide surfaces in positively holding said gripper systems steady during a transfer operation.

4. In a rotary printing press according to claim 3, in which said means defining said arcuate guide surfaces are disposed outwardly of said chains for cooperating with said pairs of spaced rollers on said gripper systems during reversal of direction of travel thereof.

5. In a rotary printing press according to claim 3, in which said guide surfaces and said rollers cooperative therewith including said control roller are disposed in a substantially common vertical plane.

6. In a rotary printing press having chain driven gripper systems comprising a plurality of automatically operated gripper systems and endless driven chains for transporting said gripper systems and having at least one other sheet-transfer system for transfer of registered sheets of material between it and said chain driven gripper systems individually, said gripper systems comprising gripper bars extending transversely of said chains and means mounting said bars on said chains, the improvement which comprises register-retaining means cooperative with said chain-driven gripper systems individually comprising, two pairs of spaced rollers on said gripper bars adjacent opposite ends thereof, each pair of rollers having the axis of the two rollers extending substantially parallel and spaced from each other, means defining at least two fixed arcuate guide surfaces disposed for engagement by a respective one of said two pairs of rollers at least during transfer of a sheet between said sheet-transfer system and the individual gripper systems, means to bias said pairs of rollers into controlled rolling engagement with said guide surfaces during an interval of travelling movement of said chains corresponding at least to said interval during which said transfer takes place between said individual chain gripper systems, the last mentioned means comprising for each pair of said pairs of rollers a third roller automatically positionable between the rollers of a given pair of said two pairs of rollers for biasing said two rollers of said given pair into steady engagement with a respective one of said surfaces during said transfer interval, means mounting each of said third rollers for movement toward and away from said guide surfaces comprising means constantly resiliently biasing each of said third rollers toward said one guide surface thereby to permit said third rollers to be moved in a direction away from said guide surfaces and to be urged between the two spaced rollers and bias them both into constant engagement with said guide surfaces during said transfer interval, and means comprising cam means cooperative with said resilient means for automatically positioning said third rollers between the two spaced rollers of a respective pair of rollers and urging them against a respective one of said surfaces, and said third rollers cooperating with said fixed guide surfaces in positively holding said gripper systems steady and in registry with said other sheet-transfer system during a transfer operation.

References Cited in the file of this patent

UNITED STATES PATENTS

| | | |
|---|---|---|
| 2,198,385 | Harrold | Apr. 23, 1940 |
| 2,577,099 | Albrecht | Dec. 4, 1951 |
| 2,775,934 | Luehrs et al. | Jan. 1, 1957 |
| 2,905,084 | Montgomery et al. | Sept. 22, 1959 |